(12) United States Patent
Damaschke et al.

(10) Patent No.: US 7,046,116 B2
(45) Date of Patent: May 16, 2006

(54) TEMPERATURE PROBE AND ITS USE

(75) Inventors: Gerhard Damaschke, Flörsheim (DE); Bruno Rudnizki, Geiselbach (DE)

(73) Assignee: Heraeus Sensor Technology GmbH, Hanau (DE)

( * ) Notice: Subject to any disclaimer, the term of this patent is extended or adjusted under 35 U.S.C. 154(b) by 0 days.

(21) Appl. No.: 10/705,063

(22) Filed: Nov. 10, 2003

(65) Prior Publication Data

US 2004/0095987 A1 May 20, 2004

(30) Foreign Application Priority Data

Nov. 12, 2002 (DE) .................. 102 52 902
May 16, 2003 (DE) .................. 103 22 166

(51) Int. Cl.
*H01C 7/02* (2006.01)

(52) U.S. Cl. .......................... 338/28; 338/25

(58) Field of Classification Search .............. 338/25, 338/28, 229, 29; 374/185, 208
See application file for complete search history.

(56) References Cited

U.S. PATENT DOCUMENTS

| | | | | |
|---|---|---|---|---|
| 2,045,640 A | * | 6/1936 | Fredericks | ............ 73/25.03 |
| 2,818,482 A | * | 12/1957 | Bennett | ............ 338/30 |
| 3,249,988 A | * | 5/1966 | Sapoff | ............ 29/613 |
| 3,749,631 A | * | 7/1973 | Hargett et al. | ............ 156/350 |
| 3,952,276 A | * | 4/1976 | Walch et al. | ............ 338/28 |
| 4,445,109 A | * | 4/1984 | Naganoma et al. | ....... 338/22 R |
| 5,857,890 A | * | 1/1999 | Ferran | ............ 445/67 |
| 6,130,598 A | * | 10/2000 | Katsuki et al. | ............ 338/28 |
| 6,136,170 A | * | 10/2000 | Inoue et al. | ............ 204/424 |
| 6,164,819 A | * | 12/2000 | Moriwake et al. | ......... 374/185 |
| 6,341,892 B1 | * | 1/2002 | Schmermund | ............ 374/185 |
| 6,543,102 B1 | * | 4/2003 | Zitzmann | ............ 338/25 |
| 6,698,922 B1 | * | 3/2004 | Adachi et al. | ............ 374/208 |
| 2002/0067243 A1 | * | 6/2002 | Noli | ............ 338/25 |
| 2002/0135454 A1 | * | 9/2002 | Ichida et al. | ............ 338/25 |

FOREIGN PATENT DOCUMENTS

| | | |
|---|---|---|
| DE | 2 327 662 | 1/1974 |
| DE | 41 04 674 A1 | 8/1992 |
| DE | 43 00 084 C2 | 7/1995 |
| DE | 198 30 821 A1 | 2/1999 |
| JP | 57-56728 A | 4/1982 |
| JP | 57-207835 A | 12/1982 |
| JP | 58-165026 A | 9/1983 |
| JP | 2-164003 * | 6/1990 |
| JP | 3-23539 Y2 | 5/1991 |
| JP | 3-165006 A | 7/1991 |
| JP | 2001-230103 * | 8/2000 |
| WO | WO 00/04356 A1 | 1/2000 |

* cited by examiner

*Primary Examiner*—Tu Hoang
(74) *Attorney, Agent, or Firm*—Akin Gump Strauss Hauer & Feld, LLP

(57) ABSTRACT

A temperature probe is provided having a sensor element formed from a ceramic substrate and a platinum thin-film resistor arranged thereon. The platinum thin-film resistor is electrically connected with at least two terminal wires, with the at least two terminal wires each being electrically and mechanically connected with a contact pin in a connection area on their side facing away from the sensor element. The diameter of the terminal wires is smaller than the diameter of the contact pins, and the connection area is covered by a glass bead. Use of the temperature probe in a temperature range of about −70° C. to +600° C. is ideal.

10 Claims, 3 Drawing Sheets

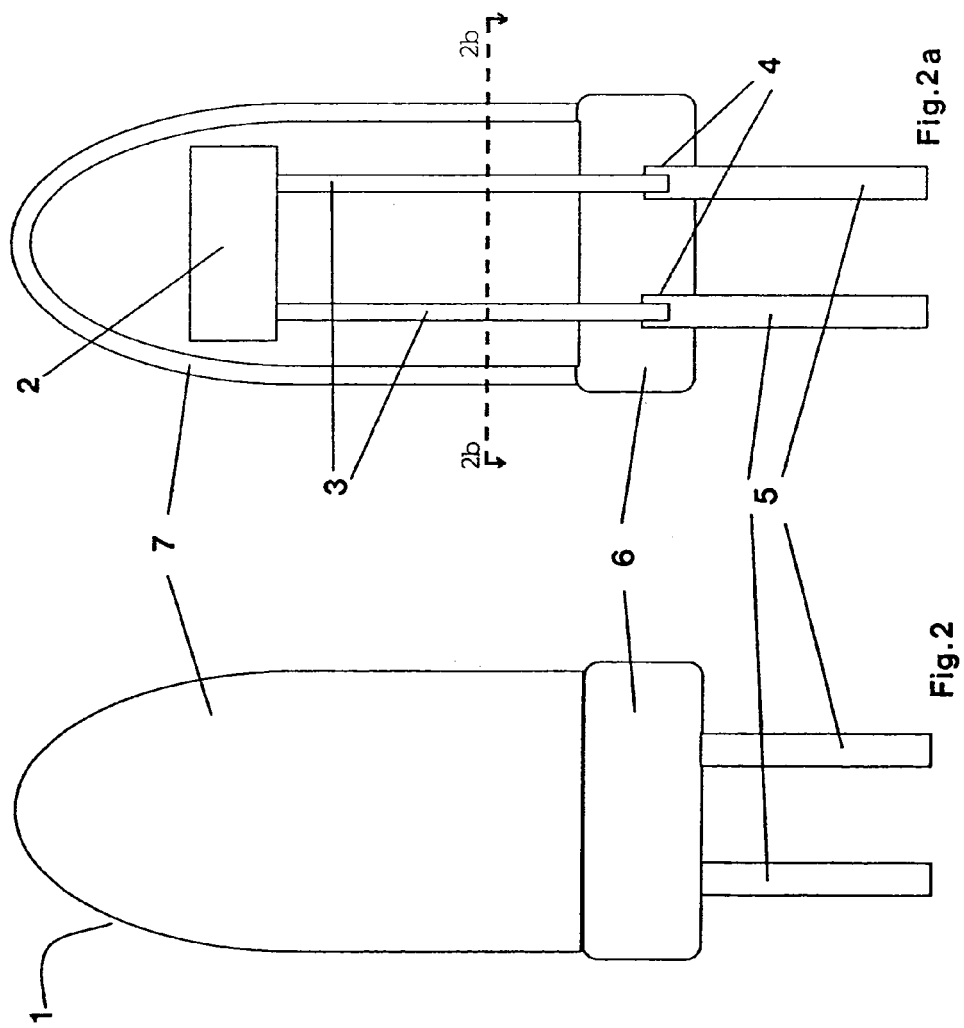

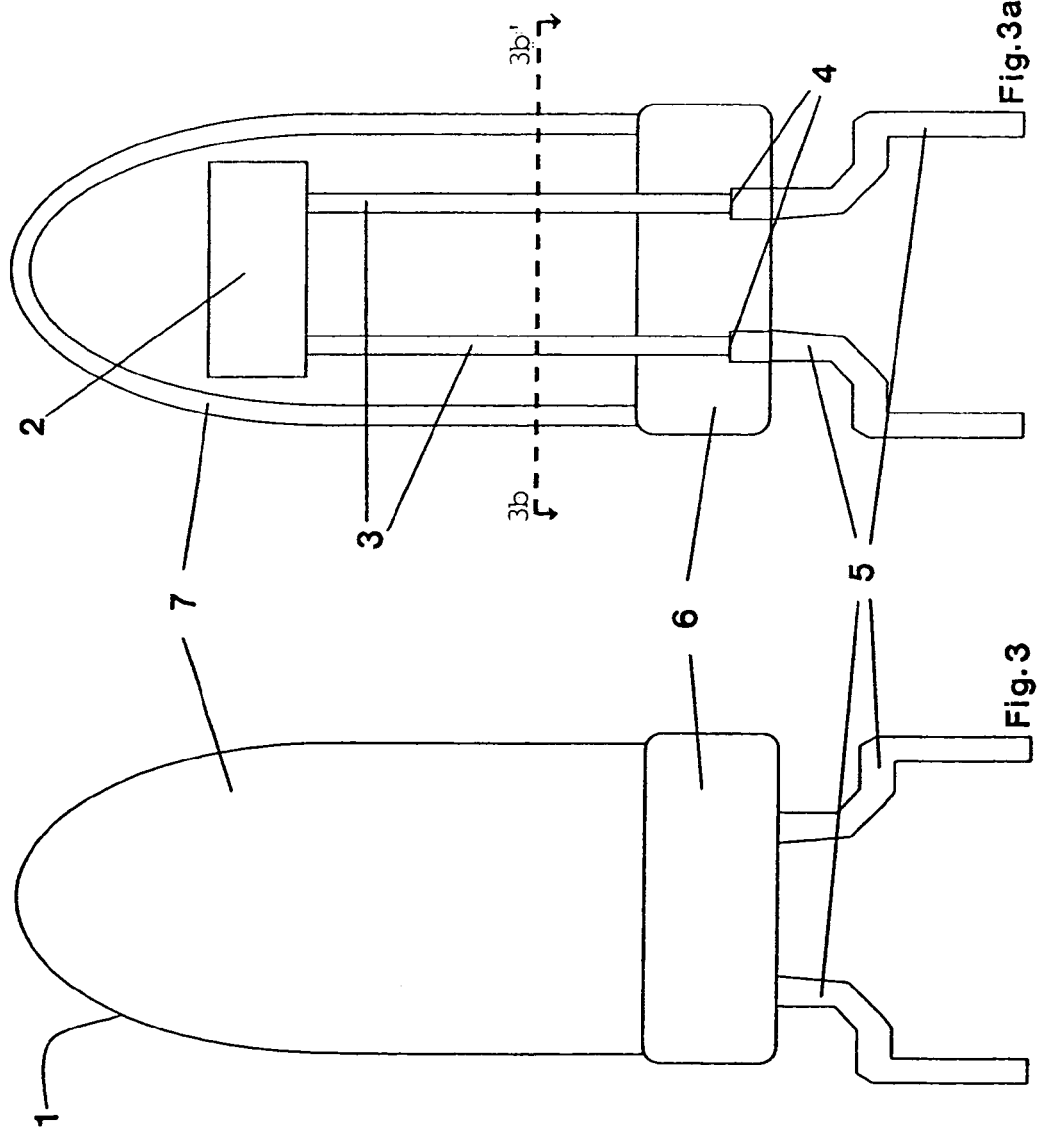

TEMPERATURE PROBE AND ITS USE

BACKGROUND OF THE INVENTION

The present invention relates to a temperature probe having a sensor element, which is formed from a ceramic substrate and a platinum thin-film resistor arranged thereon, wherein the platinum thin-film resistor is electrically connected with at least two terminal (connecting) wires. In addition, the invention relates to the use of such a temperature probe.

Temperature probes of this type are known, for example, from International Patent Application Publication No. WO 00/04356. There, a platinum resistor layer is situated on a ceramic substrate and is covered with a passivation layer. The terminal surfaces of the platinum resistor layer are electrically and mechanically connected using wires, bands, or clamps, and are subsequently sealed using a ceramic glue or a glass.

In addition, platinum temperature sensors are known in which a platinum band is wound on a thin glass tube, and the wound-on resistor is then covered with a coating or with a tube made of glass. The manual preparation required for the winding of the platinum resistor on the glass tube results in high manufacturing costs.

BRIEF SUMMARY OF THE INVENTION

An object of the present invention is to provide a temperature probe, which can be manufactured economically and with a high degree of automation.

This object is achieved in that the at least two terminal wires are each electrically and mechanically connected with a contact pin in a connection area on their side facing away from the sensor element, wherein the diameter of the terminal wires is smaller than the diameter of the contact pins, and wherein the connection area is covered by a glass bead. Here, the glass bead produces a gas-tight and moisture-tight sealing of the connection area, so that corrosion and thus a deterioration of the electrical resistances in this area is avoided. Here, the dimensions of the glass bead are preferably in the millimeter range. A glass bead having a diameter in a range of about 2 to 4 mm has proven effective.

A temperature probe of this type is preferably used in a dry environment. However, it can also be used in contact with liquid media.

A platinum thin-film resistor is understood to be a thin, optionally structured, film made of platinum or a platinum alloy. Conventionally, such resistors are manufactured using PVD (physical vapor deposition) methods, such as cathode sputtering or vacuum deposition. The sensor element, made up of the ceramic substrate and the platinum thin-film resistor arranged thereon, conventionally has extremely small dimensions. Dimensions (length×width×depth) of approximately 2 mm×2 mm×0.4 mm have proven effective for the sensor element.

It is particularly preferred when the sensor element and the terminal wires are arranged in a glass cap, wherein the glass cap is fused with the glass bead, in such a way that the sensor element and the terminal wires are enclosed in the glass cap, so as to be gas-tight and moisture-tight. The connection of the glass bead and the glass cap can take place, for example, by melting. In this way, the sensor element itself is protected mechanically and from corrosive attack. Its use in moist particle-containing gases is thus possible without problem. Here, the glass cap preferably has a length of about 5 to 15 mm, preferably about 8 to 10 mm. The inner diameter of the glass cap should preferably be selected such that the glass cap closely surrounds the sensor element, and no unnecessarily large spacing is formed that could result in a prolongation of the response time of the temperature probe. Such a temperature probe externally resembles a diode, and has similar flexibility of use and application.

The temperature probes according to the present invention are mini-sensors, which can be manufactured economically and produced and further processed with a high degree of automation. For the further processing, it has proven effective here for temperature probes according to the present invention to be provided in a belt construction (mounting of a large number of temperature probes using an assembly line for machine supplying to, for example, one assembly machine).

Due to its small dimensions, the temperature probe is flexible in its use, and can be used even in locations offering very little space for a sensor.

The temperature probe according to the present invention preferably has an overall length, including the contact pins, of about 5 mm to 30 mm, and a width of about 2.5 mm to 5 mm. In a temperature probe without a glass cap, an overall length, including the contact pins, in a range of about 15 mm to 25 mm is preferred. In a temperature probe having a glass cap, an overall length, including the contact pins, in a range of about 20 mm to 28 mm is preferred. However, as a rule, the length of the contact pins depends on the location of use, so that their length is variable within broad limits.

With temperature probes of this type having a glass cap, response times, for example in moving water (v=0.4 m/sec.), of $t_{0.5}$=0.7 sec. or $t_{0.9}$=1.8 sec., can be achieved.

The glass cap can be filled with air or with at least one noble gas, or alternatively can be evacuated.

In addition, the area between the glass cap and the sensor element or the terminal wires can be filled with an electrically insulating powder.

In particular, it has proven effective if the glass cap is arranged spaced from the sensor element. Further, it has proven effective if the glass cap has a circular, rectangular, or elliptical cross-section, taken perpendicular to the terminal wires.

The contact pins can be used both in a straight and in a bent shape. The bending of the contact pins can take place fully automatically, wherein the spacing of the contact pins from one another is conventionally set to a defined grid pitch (for example, 2.54 mm), so that an automatic assembly of the temperature probe, for example on a circuit board, is easily possible. A diameter for the contact pins in a range of about 0.4 mm to 1.0 mm has proven effective. As a material for the contact pins, nickel-plated copper wire can be used, for example.

The manufacture of a temperature probe according to the present invention takes place, for example, with the following steps:

connection of the terminal wires with a respective contact pin through laser welding;

formation of a glass bead in the connection area of the terminal wires and contact pins; and placing of a glass cap in the area of the sensor element, and fusing of the glass cap and the glass bead.

The temperature probe according to the present invention can be manufactured extremely economically and with a high degree of automation, due to its simple construction and the use of standard components. Due to its low mass, it has a particularly high response speed, or a very short response time.

The use of the temperature probe according to the present invention in a temperature range of about −70° C. to +600° C. is ideal.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a schematic plan view of a further embodiment of a temperature probe according to the present invention having a glass cap;

FIG. 2a is a schematic view of the temperature probe of FIG. 2 in longitudinal section;

FIG. 2b is a cross-section 2b–2b' of the temperature probe according to FIG. 2a;

FIG. 3 is a schematic plan view of a further embodiment of the inventive temperature probe having a glass cap;

FIG. 3a is a schematic view of the temperature probe of FIG. 3 in longitudinal section; and FIG. 3b is a cross-section 3b–3b' of the temperature probe according to FIG. 3a

DETAILED DESCRIPTION OF THE INVENTION

Figure 1A:
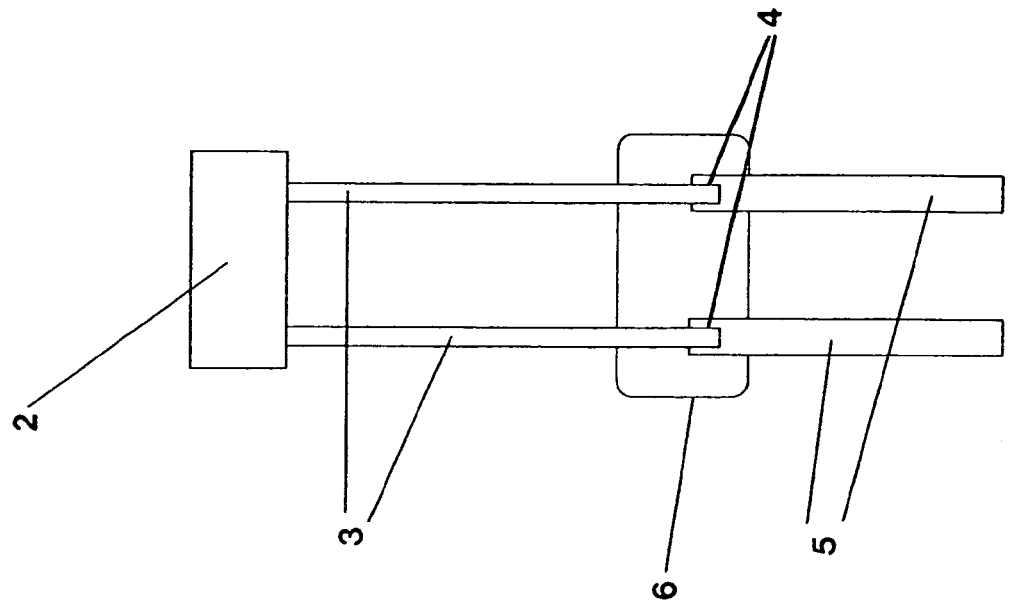
FIG. 1a is a schematic plan view of the temperature probe of FIG. 1 with an exposed connection area between the terminal wires and the contact pins.
Figure 1:
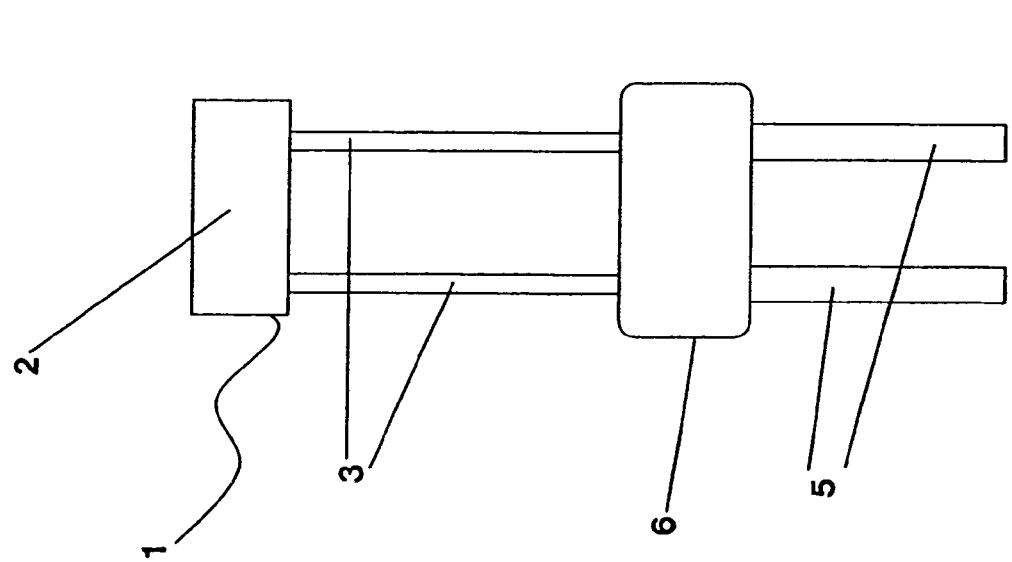
FIG. 1 is a schematic plan view of a temperature probe according to one embodiment of the present invention without a glass cap.

FIG. 1 shows a temperature probe 1 having a sensor element 2 and two terminal wires 3. Terminal wires 3 are connected with straight contact pins 5 inside a glass bead 6. See also FIG. 1a.

FIG. 1a shows the temperature probe 1 from FIG. 1 with an exposed connection area 4 between the terminal wires 3 and the straight contact pins 5. It can be seen that glass bead 6 completely surrounds or covers connection area 4 between terminal wires 3 and contact pins 5.

FIG. 2 shows a temperature probe 1 having a glass cap 7 that is fused with the approximately round glass bead 6. Straight contact pins 5 protrude from glass bead 6 and can be electrically contacted.

In FIG. 2a a longitudinal section through temperature probe 1 from FIG. 2 can be seen, wherein the arrangement of sensor element 2 inside glass cap 7 can be seen clearly. It can be seen that glass bead 6 completely surrounds or covers connection area 4 between the terminal wires 3 and the contact pins 5.

FIG. 2b shows a cross-section 2b–2b' according to FIG. 2a through temperature probe 1 from FIG. 2a, wherein the direction of view is in the direction of glass bead 6.

FIG. 3 shows a temperature probe 1 having a glass cap 7 that is fused with an approximately rectangular glass bead 6. Bent contact pins 5 protrude from glass bead 6 and can be electrically contacted.

In FIG. 3a, a longitudinal section through temperature probe 1 from FIG. 3 can be seen, wherein the arrangement of the sensor element 2 inside the glass cap 7 can be seen clearly. It can be seen that glass bead 6 completely surrounds or covers connection area 4 between the terminal wires 3 and the bent contact pins 5.

FIG. 3b shows a cross-section 3b–3b' according to FIG. 3a through temperature probe 1 from FIG. 3a, in which the direction of view is in the direction of glass bead 6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature probe comprising a sensor element (2) formed from a ceramic substrate and a platinum thin-film resistor arranged thereon, the platinum thin-film resistor being electrically connected with at least two terminal wires, the at least two terminal wires (3) each being electrically and mechanically connected with a contact pin (5) in a connection area (4) on an end of the terminal wires (3) opposite from the sensor element (2), a diameter of the terminal wires (3) being smaller than a diameter of the contact pins (5), and a glass bead (6) directly covering the electrical and mechanical connection area (4) on the end of the terminal wires (3) with the contact pins (5), the glass bead providing a gas-tight and moisture-tight sealing of and a sole support for the connection area (4), wherein the sensor element (2) and the terminal wires (3) are arranged in a glass cap (7), the glass cap (7) being fused with the glass bead (6) in such a manner that the sensor element (2) and the terminal wires (3) are enclosed in the glass cap (7) in gas-tight fashion, and wherein the glass cap (7) is arranged spaced from the sensor element (2).

2. A temperature probe comprising a sensor element (2) formed from a ceramic substrate and a platinum thin-film resistor arranged thereon, the platinum thin-film resistor being electrically connected with at least two terminal wires, the at least two terminal wires (3) each being electrically and mechanically connected with a contact pin (5) in a connection area (4) on an end of the terminal wires (3) opposite from the sensor element (2), a diameter of the terminal wires (3) being smaller than a diameter of the contact pins (5), and a glass bead (6) directly covering the electrical and mechanical connection area (4) on the end of the terminal wires (3) with the contact pins (5) but not covering the sensor element (2), the glass bead providing a gas-tight and moisture-tight sealing of and a sole support for the connection area (4), and the sensor element (2) being uncovered.

3. The temperature probe as recited in claim 1, wherein the glass cap (7) is filled with air or at least one noble gas.

4. The temperature probe as recited in claim 1, wherein a vacuum is present inside the glass cap (7).

5. The temperature probe as recited in claim 1, wherein the regions between the glass cap (7) and the sensor element (2) and the terminal wires (3) are filled with an electrically insulating powder.

6. The temperature probe as recited in claim 1, wherein the glass cap (7) has a circular cross-section, taken perpendicular to the terminal wires (3).

7. The temperature probe as recited in claim 1, wherein the glass cap (7) has a rectangular or elliptical cross-section, taken perpendicular to the terminal wires (3).

8. The temperature probe as recited in claim 2, wherein the temperature probe has an overall length, including the contact pins (5), of about 5 mm to 30 mm.

9. The temperature probe as recited in claim 2, wherein the contact pins (5) have a bent construction.

10. The temperature probe as recited in claim 2, which is adapted for use in a temperature range of about −700° C. to +600° C.

* * * * *